(No Model.)
D. C. SUMNER.
CLOTH SHEARING MACHINE.
No. 282,402. Patented July 31, 1883.
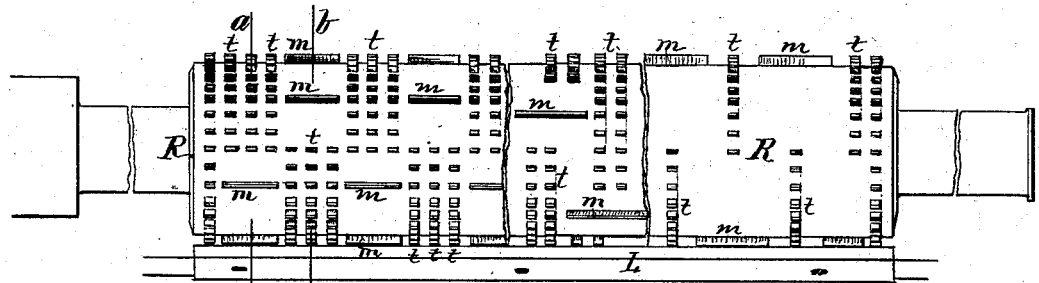
Fig. 1.
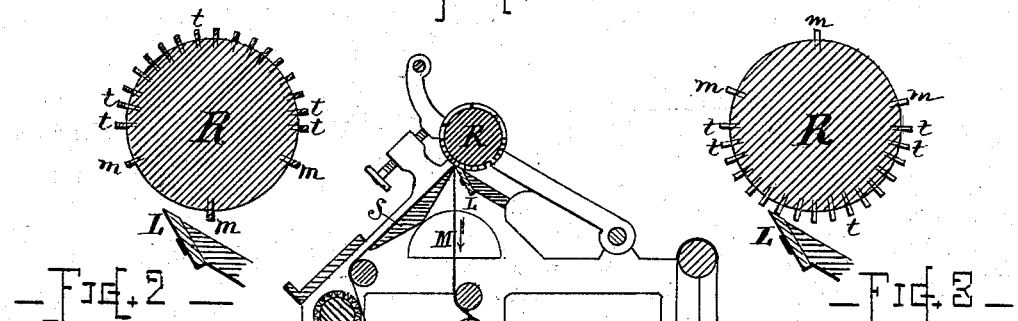
Fig. 2. Fig. 3.
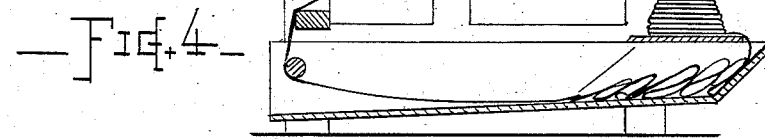
Fig. 4.
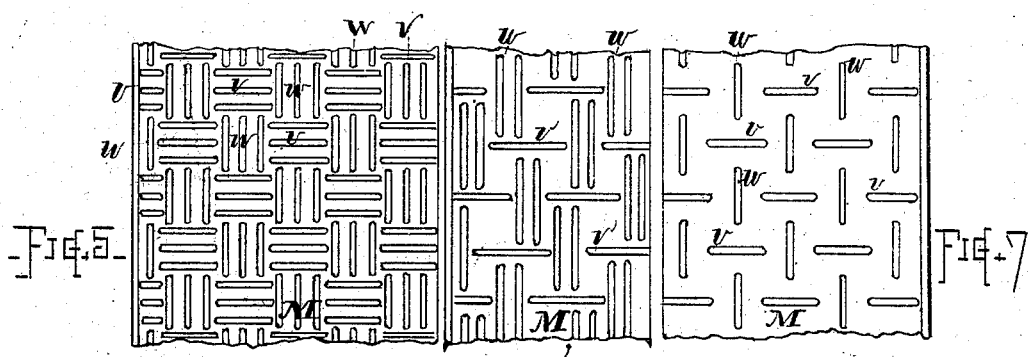
Fig. 5. Fig. 6. Fig. 7.
WITNESSES 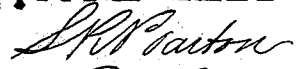
INVENTOR
Dwight Clinton Sumner,
By Chas. H. Burleigh
Attorney
N. PETERS, Photo-Lithographer, Washington, D. C.

UNITED STATES PATENT OFFICE.

DWIGHT C. SUMNER, OF WORCESTER, MASSACHUSETTS.

CLOTH-SHEARING MACHINE.

SPECIFICATION forming part of Letters Patent No. 282,402, dated July 31, 1883.

Application filed December 30, 1882. (No model.)

*To all whom it may concern:*

Be it known that I, DWIGHT CLINTON SUMNER, of Worcester, in the county of Worcester and State of Massachusetts, have invented certain new and useful Improvements in Cloth-Shearing Machines; and I declare the following to be a description of my said invention, sufficiently full, clear, and exact to enable others skilled in the art to which it appertains to make and use the same, reference being had to the accompanying drawings, which form a part of this specification.

My present invention relates to shearing cylinders or revolvers in that class of cloth-shearing machines wherein a cylinder or revolver having notched sectional or serrated blades or cutting-points is operated, in conjunction with a ledger-blade, for effecting ornamentation of the fabric by cutting away portions of the pile or nap surface thereof as the fabric is passed forward over a suitable support, guide, or rest in the machine; and my invention consists in an improved construction of the shearing-cylinder, or in a certain peculiar order or system or arrangement of the cutting-points or blade-sections on the revolver, whereby the mechanism is adapted for producing upon fabrics patterns of a peculiar class or nature composed of oppositely-directed intersecting or intermitting lines, broken checks, or alternately cross-marked plaids, as more fully hereinafter described.

In the drawings, Figure 1 is a front view of so much of a shear-revolver as is necessary to illustrate the nature of my invention. Fig. 2 is a section at line *a a*. Fig. 3 is a section at line *b b*. Fig. 4 is a vertical section, showing the relative location of the revolver, ledger-blade, and cloth-support; and Figs. 5, 6, and 7 represent pieces of fabric indicating the nature of the pattern produced by shearing mechanism constructed in accordance with my invention.

In reference to the drawings, R denotes the revolver; S, the cloth-support; L, the ledger-blade, and M the cloth or fabric moved through the machine by suitable guiding-rolls and feeding-rolls, N, which parts may be located and operated in any well-known or suitable manner.

The revolver R, I construct with its cutters disposed in the order or peculiar manner of arrangement as indicated, the system of cutting-edges consisting in series of narrow isolated points or sections *t*, developed in rows or groups of rows at intervals on the revolver, and running in circumferential direction, but only partially around the cylinder, the said rows or groups of rows being stopped off, interrupted, or offset by certain broader blade-sections *m*, interposed at occasional intervals on the peripheral circle across said rows and at such distances from each other as to form transverse cuts or lines *v* on the fabric M when such longer blades *m* come in contact with the ledger-blade L. The circumferentially - disposed rows of cutting-sections *t* produce lines *w* longitudinally of the fabric M, which lines *w* are intermitted or intersected by the transverse lines *v* cut by the longitudinal blade-sections *m*. The respective rows or groups of rows of points *t* are placed intermediate and alternating with the sets of long blade-sections *m* at the regular intervals, thereby alternating the lateral and longitudinal cuts, so as to produce figures of the nature known as "broken checks" or "plaids." (See Figs. 5, 6, and 7.)

The three styles of the pattern indicate the modifications incident to arranging the blades *t* in groups or singly, and in using one or three interposed broader sections, *m*, for interrupting or intermitting the said circumferential rows of teeth.

The revolver can be made with blades recessed to give cutting-sections at the positions required, or the sections can be formed of independently-inserted teeth or points; also, if more convenient, or desired, a slight inclination or spiral can be given the lines of the cutters in lieu of their being set to range exactly square with the axis of the cylinder. By regularly alternating groups of three partial rows of narrow sections *t* and three intercepting long blade-sections *m*, both circumferentially and laterally of the revolver, a uniform pattern of three transverse lines intermitting with three longitudinal lines is produced, as in Fig. 5, while if only one row of narrow sections *t* and one intercepting long blade-section *m* is used in the same order of arrangement the pattern has the appearance shown in Fig. 7, while the Fig. 6 illustrates a compound of two partial circumferential rows of cutters *t* intercepted by a single long blade-section *m* alternately offsetting at semi-circumferential positions on the revolver, all of these several modifications being the result of the order of arrangement embracing a row of narrow cutting-points *t* partially around the cylinder, intercepted by spaces, in which are occasional long blade-sections, as shown.

It will be understood that I do not herein broadly make claim to a shearing-revolver having notched sectional or isolated cutting-edges irrespective of the peculiar construction or order of arrangement described; but

What I claim as of my invention, and desire to secure by Letters Patent, is—

1. A revolver or shearing-cylinder for cloth-shearing machines, having series of narrow isolated cutting sections or teeth *t*, arranged in circumferential rows or groups of rows extending partially around the cylinder, and intermitted or offset on the remaining portions of the peripheral circle by long blade-sections *m*, interposed at occasional positions, in the manner and for the purpose set forth.

2. In a cloth-shearing machine, a revolver or shearing-cylinder having at intervals alternating series of narrow cutting sections, points, or teeth *t*, arranged in rows or groups of rows extending in a circumferential direction partially around the cylinder, with longer blade-sections *m*, interposed at occasional positions of the peripheral circle to intercept or offset said rows of narrow cutters *t* in the order described, whereby oppositely-directed intermitting lines are produced or sheared upon the fabric, substantially as set forth.

3. The combination, with the ledger-blade L, cloth-rest S, and feeding-rolls N in a cloth-shearing machine, of the revolver R, having upon it cutting sections or teeth disposed in the peculiar order hereinbefore described—viz., in partially-circumferential rows of narrow sections *t*, interspaced with long blade-sections *m*, alternately intercepting or offsetting the said rows of narrow sections, and vice versa, singly or in groups, substantially as shown, and for the purpose set forth.

Witness my hand this 26th day of December, A. D. 1882.

DWIGHT CLINTON SUMNER.

Witnesses:
 CHAS. H. BURLEIGH,
 S. R. BARTON.